United States Patent [19]

Freier

[11] Patent Number: 4,955,574
[45] Date of Patent: Sep. 11, 1990

[54] PIPE CLIP

[75] Inventor: Fred Freier, Baretswil, Switzerland

[73] Assignee: Egli, Fischer & Co. AG, Zurich, Switzerland

[21] Appl. No.: 379,796

[22] Filed: Jul. 17, 1989

[30] Foreign Application Priority Data

Jul. 18, 1988 [CH] Switzerland .................... 02739/88

[51] Int. Cl.$^5$ ............................................. F16L 3/08
[52] U.S. Cl. ............................ 248/316.5; 248/74.2; 403/344
[58] Field of Search ................. 248/74.3, 316.5, 74.2; 24/20 EE; 403/344

[56] References Cited

U.S. PATENT DOCUMENTS 4,557,024 12/1985 Roberts et al. .................. 24/20 EE
4,802,646 2/1989 Cattani ............................ 248/316.5

FOREIGN PATENT DOCUMENTS 3034546 4/1981 Fed. Rep. of Germany ..... 248/74.3
3014578 5/1981 Fed. Rep. of Germany ............... 3/
643338 5/1984 Switzerland .
2162416 2/1986 United Kingdom .
2183287 6/1987 United Kingdom .

Primary Examiner—Andrew V. Kundrat
Attorney, Agent, or Firm—Finnegan, Henderson, Farabow, Garrett & Dunner

[57] ABSTRACT

A pipe clip comprising a baseplate, a pair of opposed arcuate-shaped strap segments; a flexible connecting-strut connected between the baseplate and each strap segment at a point that divides the strap segment into an inner end portion and an outer end portion, and mutually engageable closure means on the outer end portions of the strap segments to lock the straps in place around a pipe. The struts maintain the strap segments in disengaged position with their inner end portions adjacent each other and their outer end portions apart to permit the insertion of a pipe into the clip whereby the force of inserting a pipe into the clip against the inner end portions of the strap segments brings the outer end portions together and the closure means into engagement.

8 Claims, 2 Drawing Sheets

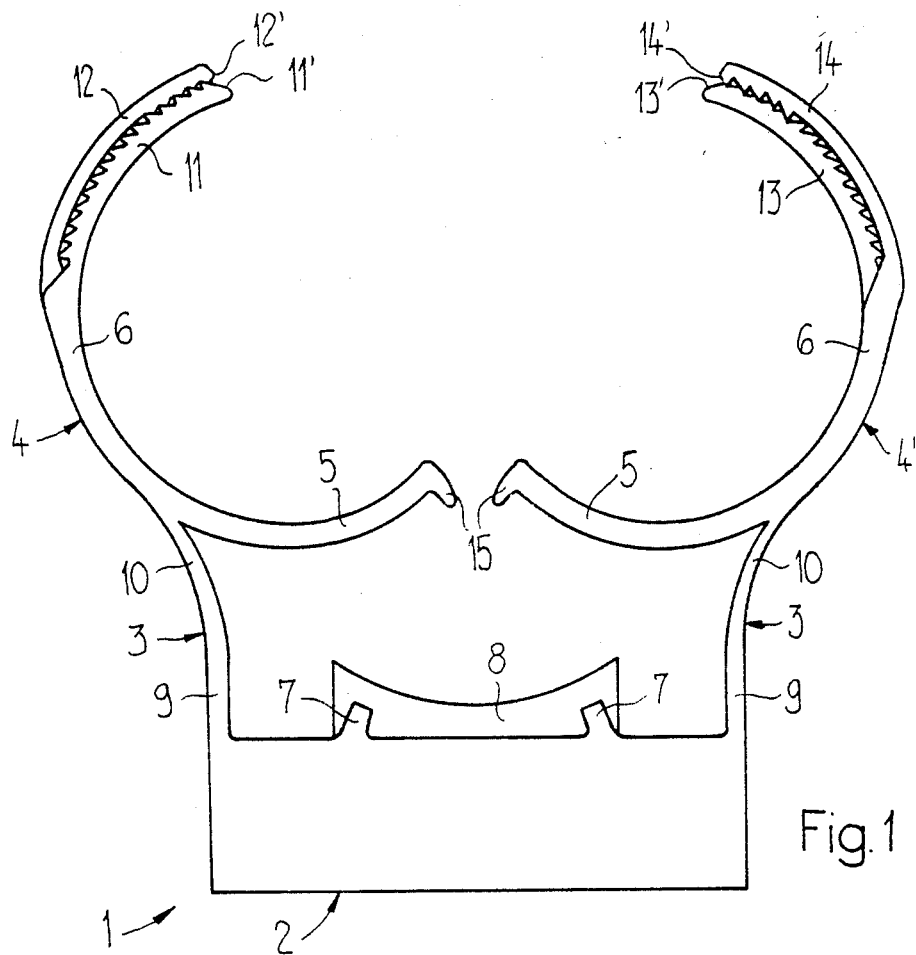
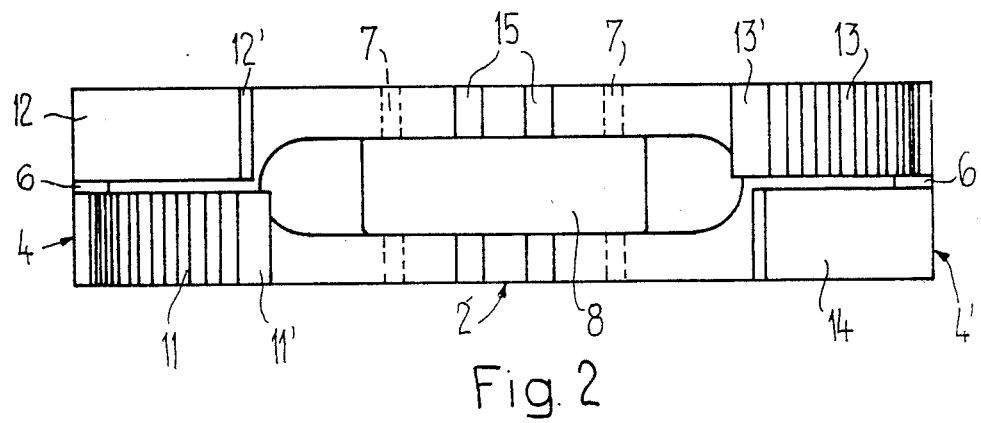

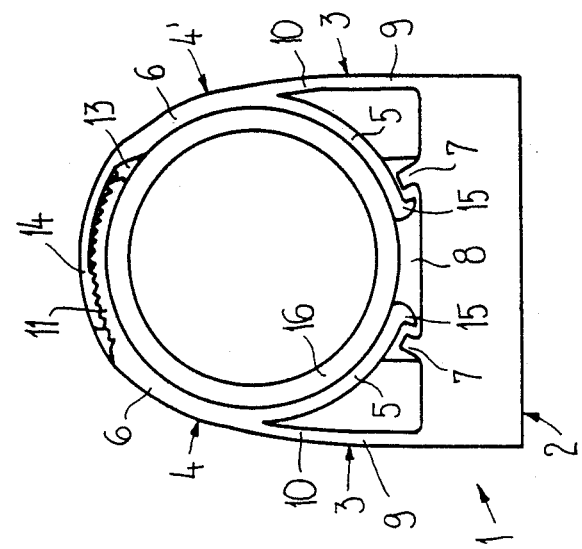
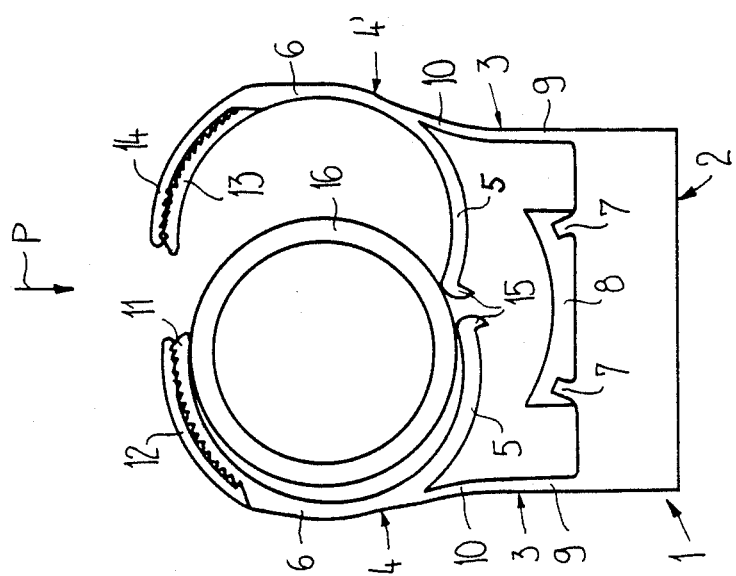

PIPE CLIP

BACKGROUND OF THE INVENTION

The invention relates to a pipe clip. More particularly, the present invention relates to a pipe clip of unitary construction having a baseplate and two opposed strap segments adapted to lock around a pipe that are held in position relative to the baseplate by flexible connecting struts.

Swiss Pat. No. 643,338 shows a pipe clip of this type having connecting struts which are connected to the strap segments by way of a hinge and which possess limited flexibility. This clip has the advantage of always ensuring perfect engagement of the closure parts when pipes of different sizes are inserted.

When the closure means is open, the outer and inner end portions of the two strap segments are approximately the same distance from one another. When a pipe is inserted the strap segments held by hinges must then be spread apart into an open position so that the ends of the outer end portions are far enough apart that a pipe can be inserted between them. This can be done manually or by pressing the pipe against the outer end portions while, if necessary, bending them out laterally at the same time, which may entail difficulties, particularly for the insertion of large, heavy and unwieldy pipes. In addition, with this known pipe clip it is possible to fasten only pipes having slight differences in diameter, so that a wide range of pipe clips is required.

In addition, a pipe clip is known from German Offenlegungsschrift No. 3,014,578, in which strap segments are likewise formed on rigid connecting struts, with the interposition of hinges. At the inner end portions of the strap segments, facing the fastening part, closure parts are formed which, when the pipe clip is closed, engage with corresponding closure parts formed on the connecting struts. In this known pipe clip, although the strap segments are held in the open position, nevertheless each connecting strut must be able by itself to take all the holding forces for the pipe, which leads to heavy forces in the connecting struts and hinges. This entails corresponding dimensioning, suitable for heavy forces, of the pipe clip and in particular of the connecting struts and hinges. Moreover, when heavy lateral forces exist secure embracing of the pipe and reliable engagement of the two closure means are not ensured.

The problem underlying the invention accordingly is to provide a pipe clip of simple construction, in which the strap segments are held in the open position and, when a pipe is inserted, automatically assume a locking position, from which secure and reliable engagement of the closure parts is effected without difficulty.

SUMMARY OF THE INVENTION

This object is achieved in accordance with the present invention by providing a pipe clip comprising a base plate, a pair of opposed arcuate-shaped strap segments; a flexible connecting-strut connected between the baseplate and each strap segment at a point intermediate their ends to divide the strap segment into an inner end portion and an outer end portion, and mutually engageable closure means on the outer end portions of the strap segments to lock the straps in place around a pipe, said struts maintaining the strap segments in disengaged position with their inner end portions adjacent each other and their outer end portions apart to permit the insertion of a pipe into the clip, whereby the force of inserting a pipe into the clip against the inner end portions of the strap segments brings the outer end portions together and the closure means into engagement.

BRIEF DESCRIPTION OF THE DRAWINGS

Further objects and advantages of the invention will appear from the following description of an embodiment of the invention as shown in the accompanying drawing in which:

FIG. 1 is an elevational view of a pipe clip according to the invention;

FIG. 2 is a top plan view thereof;

FIG. 3 is a view of the pipe clip shown in FIG. 1 into which a pipe is inserted; and FIG. 4 is a view of the pipe clip shown in FIG. 1 with the pipe inserted.

DETAILED DESCRIPTION OF THE INVENTION

The pipe clip shown in FIGS. 1 and 2 is of unitary construction and consists of a fastening or body part 1, having a baseplate 2 to which are integrally connected two flexible connecting struts 3 on either side. The ends of the connecting struts 3 remote from the baseplate are integrally connected to two opposed arcuate-shaped strap segments 4, 4', the point of connection dividing the straps into an inner or lower end portion 5 and an outer or upper end portion 6.

Baseplate 2 has stop bosses 7 and an abutment 8, the purpose of which will be explained more fully below in connection with the insertion of a pipe.

The connecting struts 3 are flexible, like leaf springs, and they thus provide a means for pivotally connecting the strap segments 4, 4' to the baseplate as a result of the deformability of the connecting strut 3. In a portion 9 adjacent the baseplate 2, the struts are thicker than at the portion 10 adjacent the straps 4, 4' so that, despite their slender shape, they do not tend to buckle or bulge out. In addition, connecting struts 3 curve outwardly so that the strap segments 4, 4' tend to remain open in a V-shaped position so that a pipe can be inserted into the opening and placed between them.

The outer end portions 6 of each strap segment 4, 4' end in two parallel closure tongues 11, 12, and 13, 14, which are provided with mutually engageable toothed closure means. As embodied, this means comprises a plurality of external serrated teeth on tongue 11 of strap 4 that cooperate with a plurality of internal teeth on tongue 14 of strap 4' and a plurality of external teeth on tongue 13 of strap 4' that cooperate with a plurality of internal teeth on tongue 12 of strap 4 to thus assume a locking position. The closure tongues 11, 13 provided with external teeth have a longer toothed area than tongues 12 and 14 to provide the closure means with an engagement range adequate for different pipe diameters. The free ends of the closure tongues 11, 12, 13, 14 are provided with beveled surfaces 11', 12', 13', 14' which are identical but oppositely disposed, in order to facilitate correct sliding of the cooperating closure tongues 11, 14, 12, 13 respectively over one another.

The inner end portions 5 of each strap segment 4, 4' have hooks 15 which engage against the stop bosses 7, to prevent overloading of the connecting struts 3 when heavy pipes are inserted into the clip. In addition, the curvature of the inner end portions is greater and they are of relatively stiffer construction than the outer end portions 6, with the consequence that, when stressed by an inserted pipe, they will merely yield in order to adapt to the contour of the pipe.

The inner end portions 5 are forked as shown in FIG. 2, so that a tool can be applied to fastening means, not shown, such as screws or the like, for mounting the pipe clip to a wall or similar surface.

FIG. 3 shows the situation when a pipe 16 is inserted into the clip. The pipe 16, which is pressed into the clip in the direction of the arrow P, applies to the end portions 5 a force directed towards the baseplate 2, with the consequence that a moment acts on the strap segments 4, ' which are initially being held in an open position. Since the connecting struts are rigidly connected to the strap segments 4, 4', a bending movement is applied to them and brings about their deformation with the consequence that they bend inwards towards each other in a closing direction. The points at which the connecting struts 3 are connected to the strap segments 4, ' thus move inwards towards one another, which in turn means that the strap segments 4, ' close up from the open V-position and move towards one another in the manner of tongs, thus increasingly gripping the pipe 16 between them. This movement is additionally assisted by the greater curvature and stiffer construction of the inner end portions 5.

FIG. 3 shows the case in which lateral forces additionally acts, so that the pipe 16 is offset laterally towards one of the strap segment 4, as readily occurs in practice when heavy, unwieldy pipes 16 are used. The mounting force directed towards the baseplate 2 has, however, the effect of closing up the strap segment 4 as described above, and thus guides the pipe 16 towards the center of the pipe clip against the action of the lateral forces. The inner end portions 5 are thus in turn increasingly pressed down to the same extent by the weight of the pipe 16, with the consequence that the closure tongues 11, 12, 13, 14 meet at the same height at the halfway point, so that the position of readiness for locking is reached. Since the radius of curvature of the strap segments 4, ' is smaller than the radius of the pipe 16 which is to be gripped, the latter is embraced by the free ends of the closure tongues 11, 12, 13, 14, which lie snugly against the pipe 16. If the pipe 16 is then pressed only slightly further into the pipe clip, the tooth closure tongues will engage with one another to lock the pipe in place in a reliable and secure manner. By providing a double closure formed by the pairs of closure tongues 11, 14 and 12, 13, the reliability of the locking action is increased and the closure will not open even if the pipe 16 is only loosely embraced by the strap segments 4, ' after the first engagement of the closure tongues.

Thus, this arrangement has the effect that a movement of the inner end portions in the direction of the fastening part entails a movement of the strap segments towards one another. A movement of the inner end portions in this way takes place when a pipe is pressed into the clip for the purpose of being fastened to the latter. Through the movement of the strap segments towards one another, even a pipe which is, for example, subjected to lateral forces will be centered in the clip during the closing operation. It is thus ensured that the outer end portions carrying the closure parts will approach one another correctly and come to lie with their end faces side by side at the same height, which corresponds to a readiness for locking from which the strap segments can be brought by a slight movement into engagement. The clip, according to the invention, is therefore particularly suitable for mounting heavy, unwieldy pipes. Moreover, pipes whose diameters vary considerably can be held by the same pipe clip reliably and, within narrow limits, equally well.

FIG. 4 shows the pipe clip with the pipe 16 inserted and locked in place. Together with the closure tongues 11, 12, 13, 14, the outer end portions 6 form a loop which encloses the pipe 16 In order to provide protection against excessive forces acting on the pipe 16, use is made of the abutment 8 and the stop bosses 7, which protect the end portions 5 and, indirectly, the connecting struts 3 against overelongation.

The end region of the abutment 8 remote from the baseplate 2 has the shape of the peripheral surface of the largest pipe 16 which is to be held.

When the strap segments 4, ' are in the open position, the connecting struts 3 may also have a rectilinear or any other shape. It would also be conceivable for the connecting struts to be formed from a leaf spring of spring steel, fastened, at least in their end regions, to the baseplate and to the strap segments respectively.

What is claimed is:

1. A pipe clip comprising a base plate, a pair of opposed arcuate-shaped strap segments, a pair of relatively flexible connecting-struts connected between the base plate and the outer side of each strap segment at a point intermediate their ends to divide the strap segment into a lower end portion and an upper end portion, said connecting struts being rigidly connected to the baseplate and being rigidly connected to the strap segments and mutually engageable closure means on the upper end portions of the strap segments to lock the straps in place around a pipe, said struts maintaining the straps segments in disengaged position with their lower end portions adjacent each other and their upper end portions apart to permit the insertion of a pipe into the clip, whereby the force of inserting a pipe into the clip against the lower end portions of the strap segments bends the connecting struts inwardly and brings the upper end portions of the straps together and the closure means into engagement.

2. The pipe clip of claim 1, wherein the clip is of unitary construction and the connecting struts are integrally connected to the straps and base plate.

3. The pipe clip of claim 2, wherein the connecting struts diverge outwardly from the baseplate toward the strap segments.

4. The pipe clip of claim 3, wherein the connecting struts have an outwardly curved arcuate shape.

5. The pipe clip of claim 2, wherein the struts are thicker adjacent the baseplate.

6. The pipe clip of claim 2, wherein the closure means comprises mutually engageable toothed closure means on the upper end portions of the strap segments, the closure means on the upper end portion of one strap segment comprising a plurality of external teeth and the closure means on the upper end portion of the other strap segment a plurality of cooperating internal teeth so that when the closure means is engaged around a pipe the strap segments are symmetrical with the axis of the pipe being held.

7. The pipe clip of claim 6, wherein the upper end portions of the two strap segments are divided into two parallel tongues lying side by side, one tongue on each strap having internal teeth and the other external teeth, while the two tongues on the other strap are of complimentary toothed configuration to provide two pairs of mutually engageable toothed closure means.

8. The pipe clip of claim 1, wherein the lower end portions of the strap segments are more sharply curved than their upper end portions.

* * * * *